United States Patent
Loos

[11] 3,709,015
[45] Jan. 9, 1973

[54] TOOL FOR THE CHIPLESS WORKING AND DEBURRING OF GEARS

[75] Inventor: Herbert Loos, Munich, Germany

[73] Assignee: Carl Hurth Maschinen-und Zahnradfabrik, Munich, Germany

[22] Filed: Oct. 6, 1970

[21] Appl. No.: 78,454

[30] Foreign Application Priority Data

Oct. 8, 1969 Germany .................. G 69 39 109.9
Feb. 5, 1970 Germany .................. G 70 04 013.0

[52] U.S. Cl. ...................... 72/71, 72/102, 72/464, 72/469
[51] Int. Cl. .............................................. B21h 5/02
[58] Field of Search .......... 72/71, 102, 107, 108, 469, 72/340, 464; 90/1.6; 29/159.2, 90

[56] References Cited

UNITED STATES PATENTS 2,658,259  11/1953  Aldino et al. .............................. 29/90
2,617,331  11/1952  Austin, Sr. ................................ 90/1.6
2,930,877   3/1960  Pelphrey .............................. 29/159.2

Primary Examiner—Lowell A. Larson
Attorney—Woodhams, Blanchard and Flynn

[57] ABSTRACT

A tool for chiplessly roll forming teeth on a workpiece wherein the edges between the tooth surfaces and the top lands are sharp so that burrs otherwise created on the workpiece dedendum are removed.

8 Claims, 7 Drawing Figures

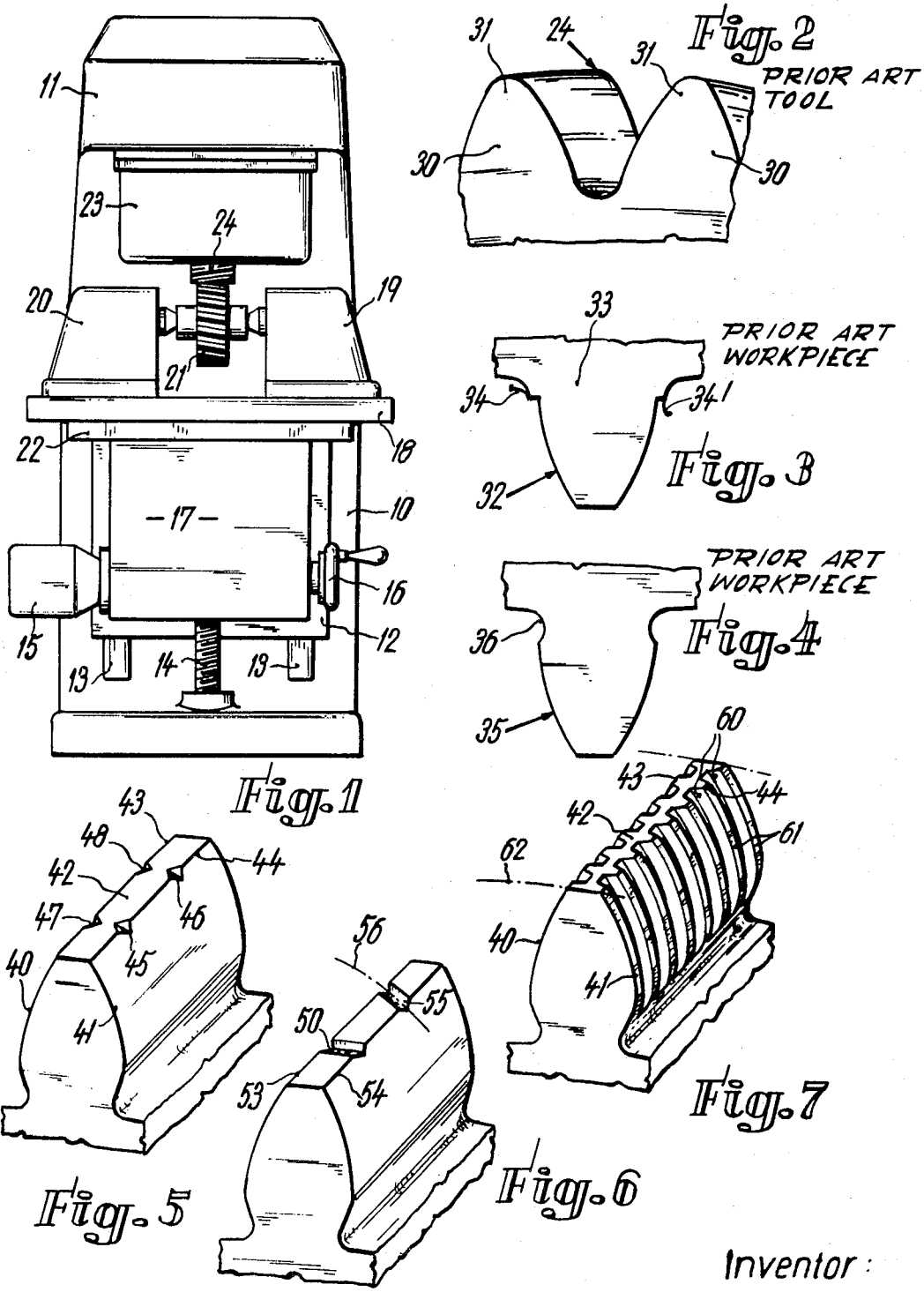

TOOL FOR THE CHIPLESS WORKING AND DEBURRING OF GEARS

The invention relates to a racklike or gearlike tool, the tooth surfaces of which are used to work a gearlike workpiece by means of rolling and without the production of chips.

In known gearlike tools for a chipless working of gears, the top portion of tool tooth surface creates a burr on the workpiece tooth dedendum of at least one tooth side during rolling due to the looplike movement of the tool tooth top. Said burr must be removed during a separate operation which makes the entire operation more expensive.

It is possible to avoid the burr by providing the workpiece tooth dedendum with a small undercut during the preworking, which undercut can for example be produced by a so-called protuberance cutter. In a thus preworked workpiece, the fillet curve is described without contacting the workpiece in the zone of the undercut. However, this undercut has the disadvantage that the tooth height, and thereby the bending moment for the application of force in the gearing is increased and the tooth dedendum thickness is at the same time reduced. This weakens the workpiece tooth.

The basic purpose of the invention is to avoid the above-described disadvantages, that is, to remove the burr without a separate operation, particularly without weakening the workpiece tooth through an undercut or the like.

To attain the basic purpose of the invention, the invention provides that the edges formed by the tooth surfaces and the top lands are sharp so that the burr otherwise created on the workpiece tooth dedendum is removed. This makes the gear working no longer completely chipless, however, the chip accumulation is in effect moved from the finish working to the main working.

If a tool is used which has interrupted tooth surfaces, then the removed burr is as long as the tooth is wide. This long burr can settle between the surfaces rolling on one another and can damage or even destroy the tooth surfaces of the workpiece.

The further purpose of the invention is to avoid the danger of damage to the workpiece tooth surfaces through the pinched-off burr. This purpose is attained by interrupting the edges of each tooth side at least one time by a groove or the like. The inventor has observed that relatively short pieces of the burr are not dangerous for the tooth surface. Thus it is advisable to provide several chip-breaking grooves per edge. The grooves can be manufactured in a simple manner if they are notches or the like connecting the edges of each tooth. Thus, the grooves or notches can also be recessed into gearlike tools or can be ground into the periphery. The chip-breaking grooves should not lie in the same rolling plane on the successive teeth because then the danger exists that the grooves or notches would leave a small burr standing. The invention is therefore further developed in such a manner that the grooves are staggered on the successive edges so that they lie in different rolling planes. The rolling planes are thereby the planes in which points of one tooth surface roll without longitudinal sliding along the other surface. During the rolling with parallel axes of workpiece and tool the rolling planes stand rectangularly on the said axes.

In order to obtain a simple manufacturing procedure, the invention is further constructed such that the grooves are notches rotating in at least one helix around the periphery of the tool. Then a staggering of the effects of said notches is obtained during the working operation. A tool of the invention can also be constructed in such a manner that the tooth surfaces are provided with grooves extending from addendum to dedendum. These grooves serve as chip breakers. They also have the advantage that through this the workpiece surface is reduced and the contact force is concentrated on a smaller surface, thus the surface pressure on the workpiece surface is increased. So that all surface portions of the workpiece come in contact with a web provided between the grooves, the grooves are according to the invention arranged offset or staggered on the successive teeth.

Further advantages and characteristics of the invention can be taken from the following description.

The invention is described in connection with FIGS. 1 to 7.

FIG. 1 illustrates a machine on which the invention can be used.

FIG. 2 illustrates two teeth of a tool according to the known state of the art.

FIG. 3 illustrates a workpiece tooth with squeezed-out burr.

FIG. 4 illustrates a workpiece tooth which is provided with an undercut in a conventional manner in order to avoid the burr.

FIG. 5 illustrates a tooth of a gearlike tool according to the invention.

FIG. 6 illustrates a further embodiment of the invention.

FIG. 7 illustrates a still further embodiment of the invention.

FIG. 1 illustrates a machine for a chipless precision working of spur gears. The machine column 10 has a conventional C-shaped construction. The one leg of the "C" is formed by the overhang 11, the lower leg is formed by a workpiece carriage 12 which is guided in vertical guideways 13 which are secured to the machine column or form one piece therewith. The workpiece carriage can be adjusted in direction of the above-mentioned guideways by means of a feed spindle 14, can be fed to diminish the axial distance between the tool 24 and the workpiece 21 and can be moved off again. The drive for same is performed in a conventional manner by an electric motor 15 and a hand wheel 16. The latter is advantageously used to preset the axial distance. The gearing between the feed spindle 14 and the electric motor 15 or the hand wheel is provided in a gear housing 17 and is not illustrated in detail. A feed nut cooperating with the feed spindle can be used in a conventional manner for the infeed. Feed spindle and feed nut can be provided only for the setting of the axial distance as initial dimension for the infeed, while the infeed is done with a conventional and therefore not illustrated cam or feed curve. The infeed can also be obtained by a feed in direction perpendicular to the plane common to workpiece axis and tool axis. The workpiece carriage 12 or the gear housing 17 carries a workpiece table 18 which receives the workpiece 21 by means of tailstocks 19, 20 or other supports in such a manner that it can rotate. A longitudinal carriage can also be provided between the workpiece carriage 12 and the workpiece table 18 which carriage can be driven through gear elements (not illustrated) and a feed spindle (also not illustrated) in a conventional manner in one direction which lies in a plane which lies rectangularly to the plane common to workpiece axis and tool axis.

A tool 24 is rotatably supported on the upper leg or overhang 11 of the C-shaped column by means of a tool carrier 23. The tool will be described in detail hereinafter. The tool can be driven in a conventional manner by a motor (not illustrated) through a gearing (not illustrated). The tool 24 is in meshing engagement with the workpiece 21; the axes of workpiece and tool are thereby positioned parallel to one another.

FIG. 2 illustrates two teeth 30 of a known gearlike tool 24. The tops 31 of the teeth are more or less strongly rounded so that a chipless rolling of the workpiece material is assured. As is known, workpiece tooth surface and tool tooth surface do not roll solely along one another but they also slide in direction of the tooth height (in the direction of the involute), namely the sliding becomes greater, the closer the contact of the tooth surfaces gets to the addendum and to the dedendum. Through this, by using conventional tools, the burr mentioned in the beginning is created. Same is schematically shown in FIG. 3 wherein a workpiece tooth 32 is illustrated. Due to the relative sliding a burr 34, 34' is pressed out at the tooth dedendum 33 of at least one tooth side, however, in most cases of both sides, by the fillet curve, which burr must be removed by a subsequent separate operation.

FIG. 4 illustrates a tooth 35 of a workpiece which has an undercut 36 at the dedendum which undercut prevents the burr formation at the fillet curve. However, this weakens the tooth.

FIG. 5 illustrates as an exemplary embodiment of the invention a tooth of a gearlike tool according to the invention. The tooth surfaces 40, 41 are curved in a conventional manner, for example toward one involute. The exemplary embodiments are also valid for racklike tools in which case the teeth do not have bent but instead straight surfaces. The tooth surfaces together with the top land 42 form edges 43, 44 which are sharp according to the invention in order to pinch off the burr created during the chipless working. In order for the shaving produced by the pinching-off of the burr to be shorter than the face width, at least one groove, in the example two grooves 45, 46 or 47, 48 are worked into each one of the edges 43, 44. The grooves are preferably relatively close together. According to experience, a burr of approximately 5 mm. (0.2 inches) on gears having a size up to approximately module 3 mm. (DP 8/inches) is still not dangerous.

FIG. 6 illustrates two further exemplary embodiments. The tool tooth is provided with a groove 50 which connects the two top edges 53, 54. To prevent burr from remaining on the workpiece due to this groove, the grooves should be arranged slightly offset on the adjacent tooth (not illustrated) so that all grooves are staggered on the respective successive teeth. This staggering is obtained practically automatically if the grooves 55 (in back of FIG. 6) in gearlike tools are worked into the top lands following a helix 56. In the case of racklike tools the grooves are arranged oblique in a corresponding manner.

FIG. 7 illustrates a tooth of a tool according to a further illustrative embodiment of the invention. Differing from the known tooth (FIG. 2) the tooth surfaces 40, 41 and the top land 42 form sharp edges 43, 44 with which the burr 34, 34' is removed. The tooth surfaces are provided with grooves 60 extending from addendum to dedendum, which grooves form webs 61 between one another and on the ends. On one hand these grooves act as chip breaker at the top edges, on the other hand the use of the webs increases the surface pressure and makes the deformation of the workpiece material easier. The grooves must also be staggered on the successive teeth. The deburred top edge can be sharpened by grinding the outside cylinder 62 or other formed outside body. The grooves 60 are in the tool of the invention arranged in such a manner that the edges formed by their walls and the tooth surfaces remove no shavings. Thus, the tool operates chiplessly. Shavings accumulate only through the deburring with the top edges.

The invention can easily be applied on racklike tools without the above description would have to be supplemented herefor.

The embodiments of the invention in which an exclusive property or privilege is claimed are defined as follows:

1. In a gearlike tool for use in machines for forming teeth on the peripheries of gear blanks by rolling, said gearlike tool having a plurality of teeth, each having a pair of oppositely facing tooth surfaces connected at the upper edges thereof by a top land, wherein the improvement comprises a sharp edge between said top land and each of said tooth surfaces.

2. The improvement according to claim 1, including at least one groove in each of said sharp edges.

3. The improvement according to claim 1, wherein said tool is a racklike tool.

4. The improvement according to claim 1, wherein said tool has a rolling outside body.

5. The improvement according to claim 2, wherein the grooves are notches or the like in said top land extending between the sharp edges of each tooth.

6. The improvement according to claim 5, wherein the notches are staggered on the successive edges so that they lie in different rolling planes.

7. The improvement according to claim 5, wherein said notches are curved in at least one helix around the periphery of the tool.

8. The improvement according to claim 1, wherein the tooth surfaces are provided with grooves extending from addendum to dedendum.

* * * * *